(12) United States Patent
Matsubara et al.

(10) Patent No.: US 7,426,973 B2
(45) Date of Patent: Sep. 23, 2008

(54) HYBRID POWER UNIT

(75) Inventors: Tooru Matsubara, Toyota (JP); Hiroatsu Endo, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 156 days.

(21) Appl. No.: 11/580,957

(22) Filed: Oct. 16, 2006

(65) Prior Publication Data

US 2007/0107956 A1 May 17, 2007

(30) Foreign Application Priority Data

Oct. 21, 2005 (JP) ............................. 2005-307480

(51) Int. Cl.
*B60K 1/00* (2006.01)

(52) U.S. Cl. .................. 180/65.2; 180/65.1; 180/65.4; 180/220; 180/214

(58) Field of Classification Search ................ 180/65.2, 180/65.1, 65.4, 220, 214
See application file for complete search history.

(56) References Cited

U.S. PATENT DOCUMENTS

| | | | |
|---|---|---|---|
| 6,881,168 B2 * | 4/2005 | Bowen | 475/5 |
| 6,907,948 B2 * | 6/2005 | Wakashiro et al. | 180/65.2 |
| 7,164,247 B2 * | 1/2007 | Joe et al. | 318/432 |
| 7,195,088 B2 * | 3/2007 | Matsueda et al. | 180/205 |
| 7,198,123 B2 * | 4/2007 | Imazu et al. | 180/65.2 |

FOREIGN PATENT DOCUMENTS

| | | |
|---|---|---|
| JP | A 6-319210 | 11/1994 |
| JP | A 2004-203219 | 7/2004 |
| JP | A-2005-030510 | 2/2005 |
| JP | A-2005-110418 | 4/2005 |

\* cited by examiner

*Primary Examiner*—Christopher Ellis
*Assistant Examiner*—Cynthia F. Collado
(74) *Attorney, Agent, or Firm*—Oliff & Berridge, PLC (57) ABSTRACT

A first reduction section of a hybrid power unit reduces an output of a motor when a transmission is shifted. A charge determining section determines whether charging of a battery is permitted. If the charge determining section determines that charging of the battery is not permitted in a period where the first reduction section reduces the output of the motor, a second reduction section reduces a power generation amount of a generator. Therefore, a shift shock is reliably prevented without generating response delay in an output rotation in the hybrid power unit.

7 Claims, 7 Drawing Sheets

HYBRID POWER UNIT

BACKGROUND OF THE INVENTION

The present invention relates to a hybrid power unit which charges a power storage device on the basis of an electric power generated by distributing a part of a power output by a main power source to a rotation output shaft, and distributing the other portions to a generator, and transmits the power to the rotation output shaft via a transmission by an electric motor driven by one or both of the electric power of the generator and the electric power of the power storage device.

As a hybrid power unit, for example, as a hybrid power unit for a vehicle, there has been known an apparatus which distributes an output of an internal combustion engine to a generator and a rotation output shaft, and transmits a power from an electric motor to the rotation output shaft via a transmission (refer, for example, to Japanese Laid-Open Patent Publication No. 2004-203219).

In this hybrid power unit, in order to prevent a shift delay and a shift shock at a time of a power-off shift, a rotating speed of the electric motor is controlled so as to come to a target rotating speed at a time of the power-off shift.

As another hybrid power unit, it has been proposed that an apparatus for preventing a shock at a time of shifting by reducing the torque of the electric motor, in the case that the torque is transmitted to the rotation output shaft from the electric motor at a time of shifting (refer, for example, to Japanese Laid-Open Patent Publication No. 6-319210).

It is expected that the shock at a time of shifting under a wide-range operating state can be prevented by applying the shift shock prevention achieved by the torque reduction of the electric motor described in Japanese Laid-Open Patent Publication No. 6-319210 to the hybrid power unit described in Japanese Laid-Open Patent Publication No. 2004-203219.

However, there is a case that the power storage device temporarily storing the electric power generated by the generator is limited in charging. In other words, in the case that the power storage device is in a charged state equal to or more than a reference value, it is necessary to stop the charging for preventing an overcharge and protecting the power storage device. Further, even in the case that a charging capacity of the power storage device is lowered at a time of a low temperature, it is also necessary to stop the charging for protecting the power storage device.

In the hybrid power unit described in Japanese Laid-Open Patent Publication No. 2004-203219 in the case of applying the structure in Japanese Laid-Open Patent Publication No. 6-319210 thereto, since an electric power consumption by the electric motor is lowered by reducing the torque of the electric motor, the charging amount with respect to the power storage device is increased.

At this time, if the charging is limited as mentioned above, it is necessary to cope with the torque reduction of the electric motor caused by lowering the output of the internal combustion engine and the charging prevention caused by the power generation of the generator. In the case that the output of the internal combustion engine is lowered, it is necessary to restore the output of the internal combustion engine at the same time of dissolving the torque reduction of the electric motor before and after an end of the shift.

However, it takes a long time to restore the output of the internal combustion engine, and response delay in a vehicle drive disturbs a driver.

If the torque reduction of the electric motor is inhibited at a time of shifting for preventing such response delay, it is impossible to prevent the shift shock.

SUMMARY

An objective of the present invention is to reliably prevent a shift shock without generating response delay in an output rotation in the hybrid power unit mentioned above.

According to one aspect of the invention, a hybrid power unit including a main power source and a rotation output shaft is provided. Driving force output by the main power source is transmitted to the rotation output shaft. The driving force of the main power source is transmitted to a generator. The power is distributed to the rotation output shaft and the generator. Electricity generated by the generator is charged to a battery. A motor is driven by at least one of electricity from the generator and electricity from the battery. A transmission transmits the driving force of the motor to the rotation output shaft. A first reduction section reduces the output of the motor when the transmission is shifted. A charge determining section determines whether charging of the battery is permitted. If the charge determining section determines that charging of the battery is not permitted in a period where the first reduction section reduces the output of the motor, a second reduction section reduces a power generation amount of the generator.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An embodiment of the present invention will now be described with reference to FIGS. 1 to 7.

Figure 1:
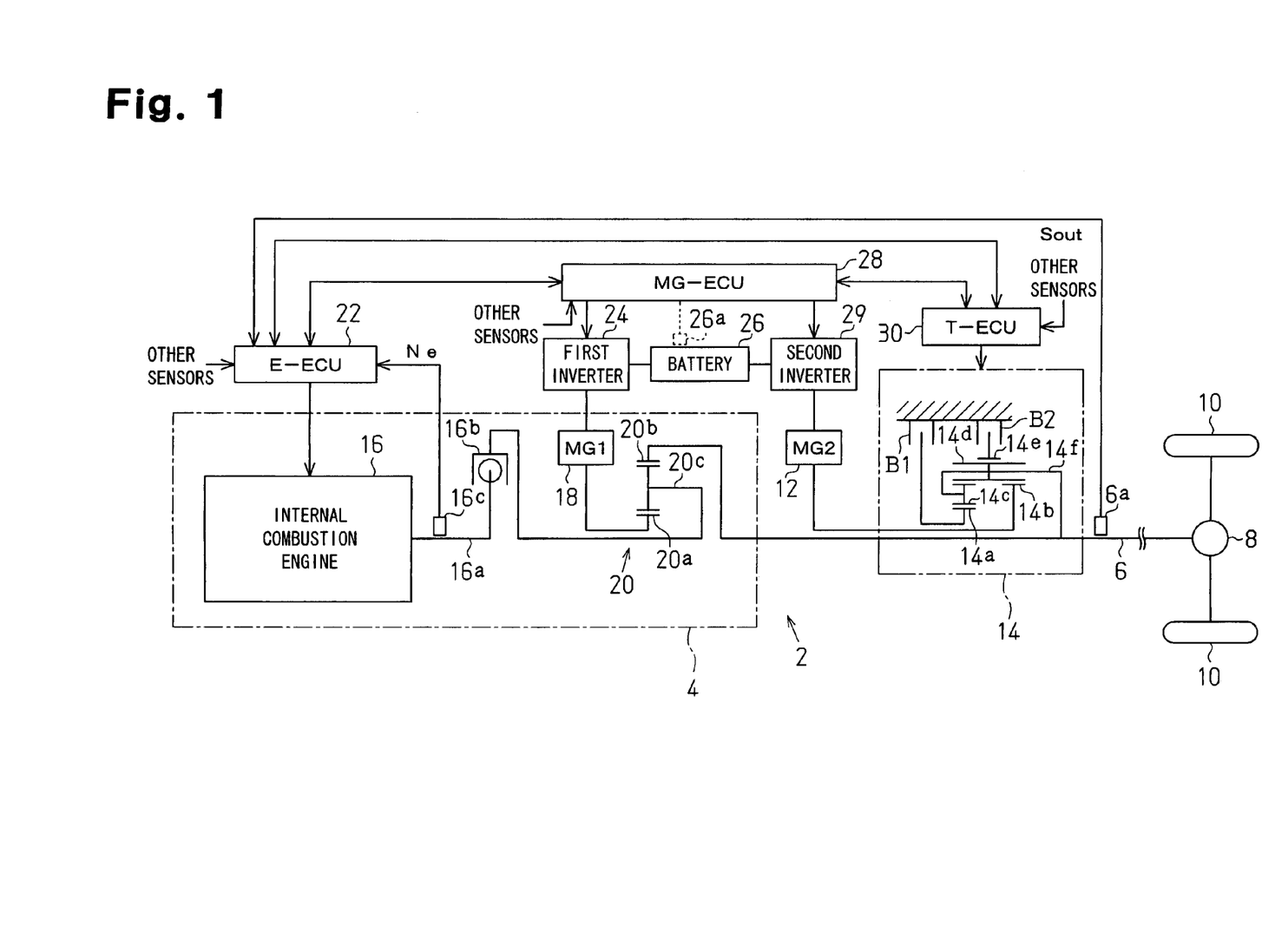
FIG. 1 is a block diagram showing a structure of a hybrid power unit for a vehicle in accordance with a first embodiment.

FIG. 1 is a block diagram showing a structure of a hybrid power unit 2 for a vehicle. The hybrid power unit 2 for the vehicle is mounted on a vehicle, and a power of a power source 4 is transmitted to a rotation output shaft 6, and is transmitted as a driving force to drive wheels 10 from the rotation output shaft 6 via a differential gear 8. On the other hand, there is provided a motor generator 12 (hereinafter, refer to as "MG2") corresponding to an assist power source capable of executing a power running control for outputting the driving force for traveling or a regenerative control for collecting an energy. The MG2 is coupled to the rotation output shaft 6 via a transmission 14, and the power transmitted between the MG2 and the rotation output shaft 6 is increased and decreased in correspondence to a change gear ratio set in the transmission 14.

The power source 4 is mainly constituted by an internal combustion engine 16, a motor generator 18 (hereinafter, refer to as "MG1"), and a planetary gear mechanism 20 combining or distributing a torque between the internal combustion engine 16 and the MG1. The internal combustion engine 16 is a power unit such as a gasoline engine, and a diesel engine, and is structured so as to be capable of electrically controlling an operation state such as a throttle opening degree (an intake amount), a fuel supply amount, and an injection timing. The control thereof is executed by an electronic control unit (E-ECU) 22 mainly constituted by a microcomputer.

The MG1 is a synchronous motor, and is structured so as to function as an electric motor and a function serving as a generator, and is connected to a power storage device, a battery 26 in this case, via a first inverter 24. An electronic control unit (MG-ECU) 28 mainly constituted by a microcomputer controls the first inverter 24, whereby a torque (an output torque and a regenerative torque) of the MG1 is set.

In this case, the MG2 mentioned above is connected to the battery 26 via a second inverter 29. Further, a power running, a regeneration and torques in the respective cases are controlled on the basis of a control of the second inverter 29 by the MG-ECU 28.

The planetary gear mechanism 20 is a gear mechanism having a sun gear 20a, a ring gear 20b coaxially arranged with the sun gear 20a, and a carrier 20c holding a pinion gear engaging with the sun gear 20a and the ring gear 20b so as to freely rotate on its axis and revolve as three rotation elements and generating a differential operation. A rotation output shaft (a crank shaft in this case) 16a of the internal combustion engine 16 is coupled to the carrier 20c via a damper 16b, whereby the carrier 20c is formed as an input element. In this case, the rotation of the rotation output shaft 16a of the internal combustion engine 16 is detected by the E-ECU 22 by means of an engine speed sensor 16c. Further, an output shaft rotating speed Sout of the rotation output shaft 6 is detected by an output shaft rotating speed sensor 6a.

The MG1 is coupled to the sun gear 20a, and the sun gear 20a is formed as a reaction element. Accordingly, the ring gear 20b is formed as an output element, and is coupled to the rotation output shaft 6. An alignment chart of the planetary gear mechanism 20 serving as the torque distributing mechanism (also functioning a torque combining mechanism) is as shown in section (A) of FIG. 2. Accordingly, it is possible to distribute a part of the power of the internal combustion engine 16 to the rotation output shaft 6, and distribute the other portion to the MG1.

The transmission 14 is constituted by a pair of Ravigneaux type planetary gear mechanisms. In other words, a first sun gear 14a and a second sun gear 14b are provided, a short pinion 14c is engaged with the first sun gear 14a, and the short pinion 14c and the second sun gear 14b are engaged with a long pinion 14d having a longer axial length. Further, the long pinion 14d is engaged with a ring gear 14e coaxially arranged with each of the sun gears 14a and 14b. Each of the pinions 14c and 14d is held by a carrier 14f so as to freely rotate on its axis and revolve. Accordingly, the first sun gear 14a and the ring gear 14e structure a mechanism corresponding to a double pinion type planetary gear mechanism together with each of the pinions 14c and 14d, and the second sun gear 14b and the ring gear 14e structure a mechanism corresponding to a single pinion type planetary gear mechanism together with the long pinion 14d.

There are provided with a first brake B1 selectively fixing the first sun gear 14a, and a second brake B2 selectively fixing the ring gear 14e. These brakes B1 and B2 are structured such that torque capacities thereof are continuously changed in correspondence to an engaging force by a hydraulic pressure, an electromagnetic force or the like. In the present embodiment, the hydraulic pressure is used. The MG2 mentioned above is coupled to the second sun gear 14b, and the carrier 14f is coupled to the rotation output shaft 6.

Accordingly, the transmission 14 is structured such that the second sun gear 14b corresponds to an input element, the carrier 14f corresponds to an output element, a high-speed stage having a change gear ratio more than 1 is set by engaging the first brake B1, and a low-speed stage having the change gear ratio larger than the high-speed stage is set by engaging the second brake B2 in place of the first brake B1. The shift between the respective shift stages is executed on the basis of a traveling state such as a vehicle speed, and a demanded driving force (or an accelerator pedal depression degree). More specifically, a shift stage region is previously determined as a map (a shift graph), and the control is executed in such a manner as to set any one shift stage in correspondence to the detected operation state. This control is executed by an electronic control apparatus (T-ECU) 30 mainly constituted by a microcomputer.

Figure 2:
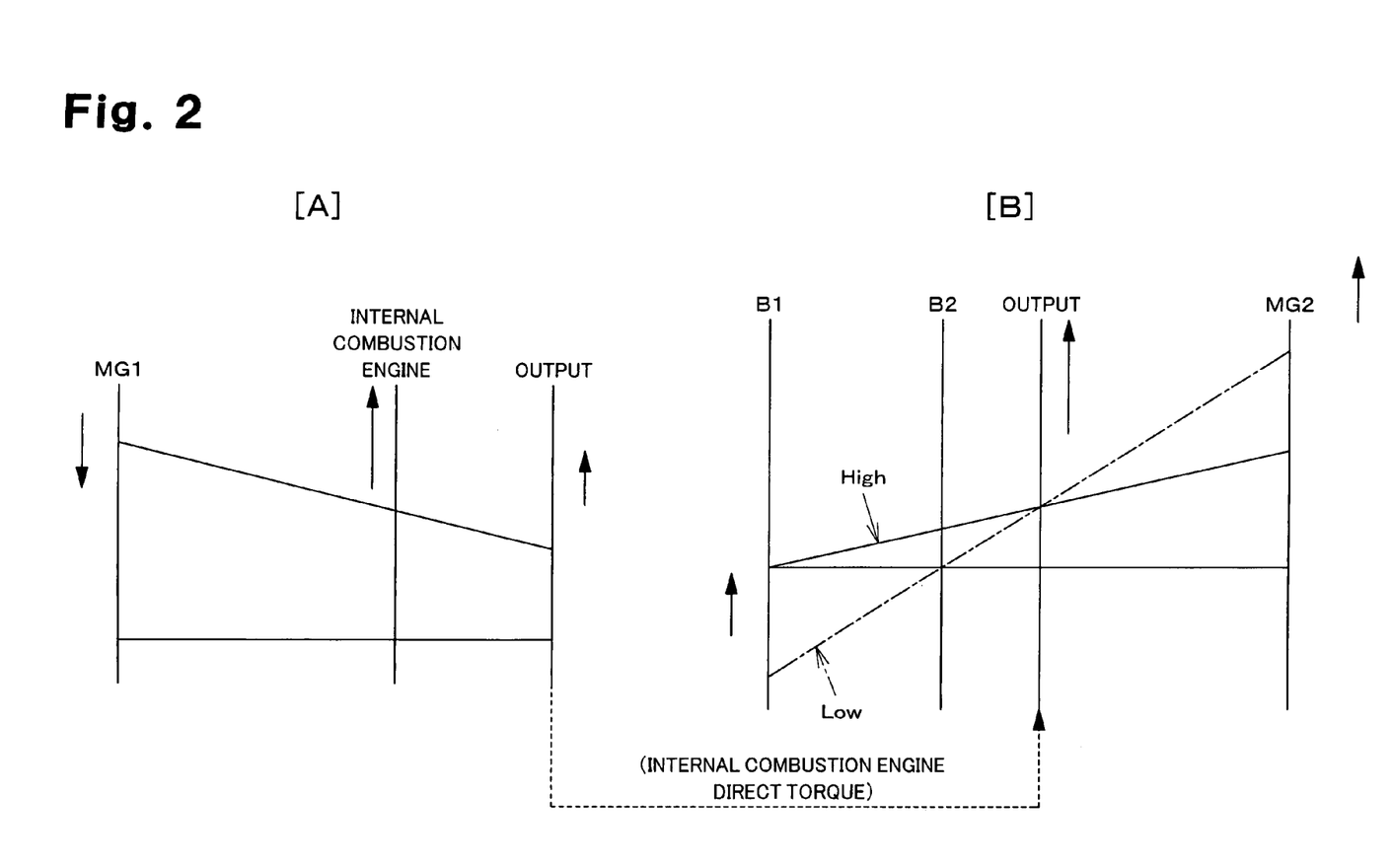
FIG. 2 is an alignment chart in a planetary gear mechanism of the hybrid power unit for the vehicle mentioned above and a transmission.

An alignment chart of the transmission 14 is as shown in section (B) of FIG. 2. If the ring gear 14e is fixed by the second brake B2, a low speed stage Low is set, and the torque output by the MG2 is amplified corresponding to the change gear ratio so as to be applied to the rotation output shaft 6. If the first sun gear 14a is fixed by the first brake B1, a high speed stage High having a smaller change gear ratio than the low speed stage Low is set. Since the change gear ratio in the high speed stage High is smaller than 1, the torque output by the MG2 is increased in correspondence to the change gear ratio so as to be applied to the rotation output shaft 6.

In a state in which each of the speed stages Law and High is set in a stationary manner, the torque applied to the rotation output shaft 6 comes to a torque obtained by increasing the output torque of the MG2 in correspondence to the change gear ratio. However, the torque comes to a torque affected by the torque capacity in each of the brakes B1 and B2, an inertia torque in accordance with the rotation change or the like, in a shift transient state. Further, the torque applied to the rotation output shaft 6 comes to a positive torque in a drive state of the MG2 and comes to a negative torque in a driven state.

The hybrid power unit 2 improves a specific fuel consumption as well as reduces an amount of exhaust gas by operating the internal combustion engine 16 as efficiently as possible, and improves the specific fuel consumption by executing an energy regeneration. Accordingly, in the case that a great driving force is required, it drives the MG2 so as to apply the torque to the rotation output shaft 6 in a state of transmitting the torque of the power source 4 to the rotation output shaft 6. In this case, the transmission 14 is set to the low speed stage Low so as to enlarge the applied torque in a state of the low vehicle speed, and in the case that the vehicle speed is thereafter increased, the transmission 14 is set to the high speed stage High so as to lower the rotating speed of the MG2. Accordingly, it is possible to maintain the drive efficiency of the MG2 in a favorable state so as to prevent the specific fuel consumption from being deteriorated.

Accordingly, in the hybrid power unit 2, the shift by the transmission 14 is executed during the traveling in which the MG2 is operated. The shift is executed by switching the engagement and disengagement state of each of the brakes B1 and B2. In the case of switching from the low speed stage Low to the high speed stage High, the shift from the low speed stage Low to the high speed stage High is executed by disengaging the second brake B2 from the engaged state and simultaneously engaging the first brake B1. On the contrary, in the case of switching from the high speed stage High to the low speed stage Low, the shift from the high speed stage High to the low speed stage Low is executed by disengaging the first brake B1 from the engaged state and simultaneously engaging the second brake B2.

Figure 3:
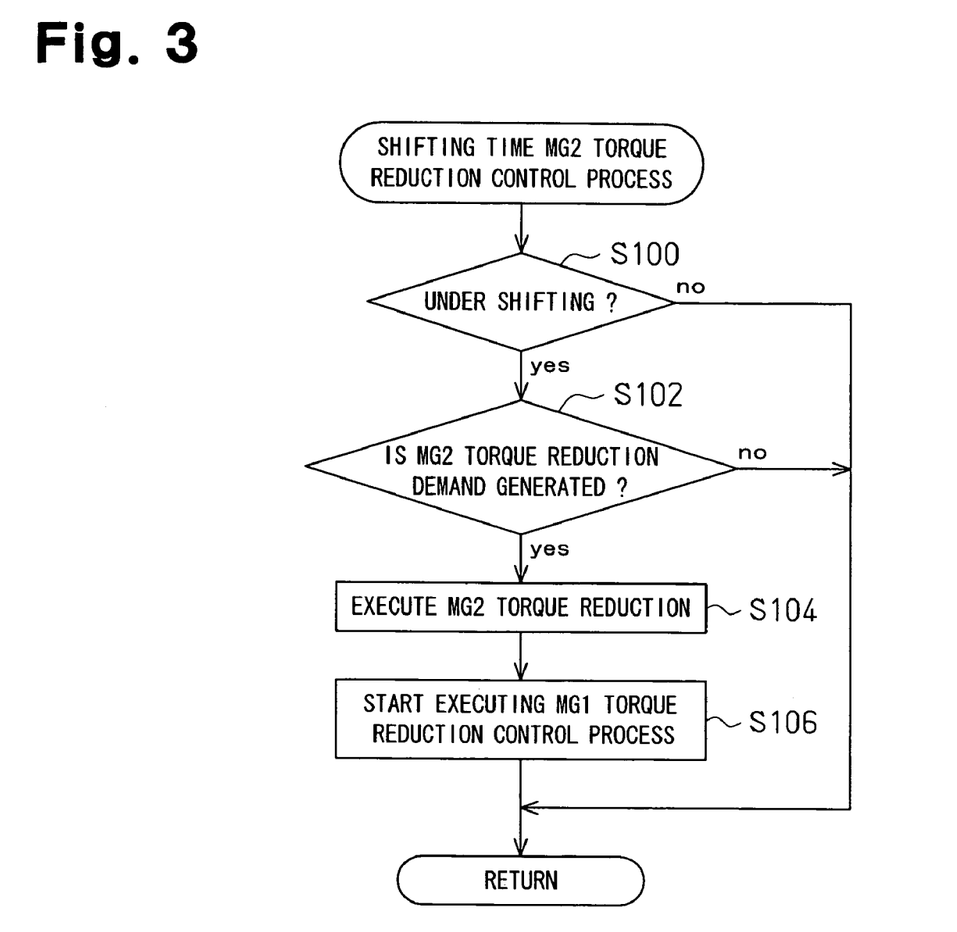
FIG. 3 is a flowchart of a shifting time MG2 torque reduction control process executed by an MG-ECU of the hybrid power unit for the vehicle mentioned above.
Figure 4:
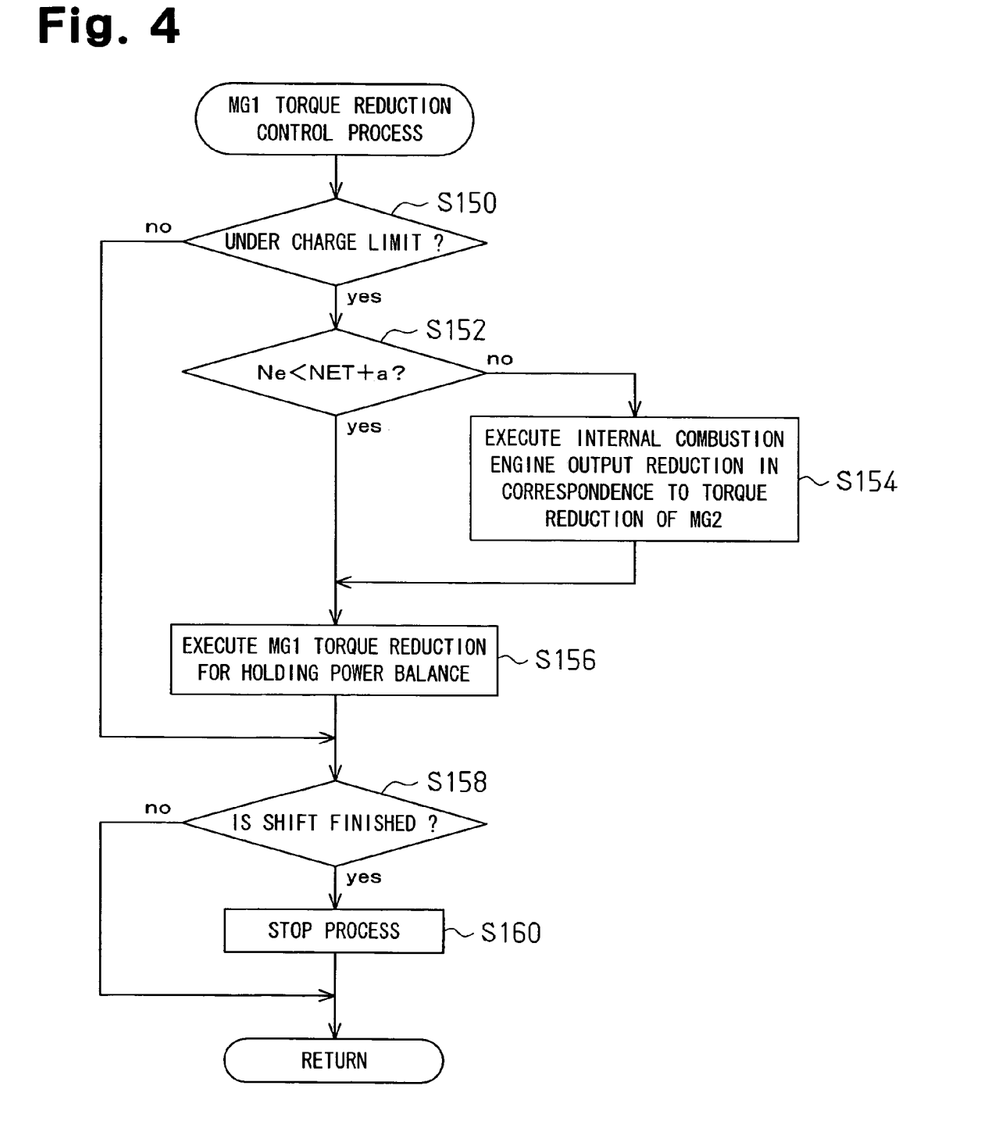
FIG. 4 is a flowchart of an MG1 torque reduction control process executed by the MG-ECU of the hybrid power unit for the vehicle mentioned above.

A torque reduction control process to the MG1 and the MG2 executed at a time of shifting the transmission 14 is shown by flowcharts in FIGS. 3 and 4. One example of the control is shown in timing charts in FIGS. 5 to 7. These torque reduction control processes are executed by an MG-ECU 28. In this case, the MG-ECU 28 exchanges information with an E-ECU 22 and a T-ECU 30 by data communication. Further, each of the ECUs 22, 28 and 30 acquires data for control by respective sensors.

A description will be given of a shifting time MG2 torque reduction control process (FIG. 3). The present process corresponds to a process which is repeatedly executed in a fixed time cycle.

When the present process is started, it is first determined on the basis of the control state of the T-ECU 30 whether or not the transmission 14 is under shifting (S100). If it is not under shifting (no in S100, before t0 in FIG. 5), the present process is finished as it is. Accordingly, no substantial process is executed.

If the transmission 14 is under shifting (yes in S100, after t0 in FIG. 5), it is determined whether or not the torque reduction demand of the MG2 is output from the T-ECU 30 (S102). In order to prevent the shift shock in the middle of the shift control, the T-ECU 30 demands the torque reduction of the MG2 to the MG-ECU 28, and it is determined whether or not this demand has been generated. If the demand has not been generated yet (no in S102, before t1 in FIG. 5), the present process is finished as it is.

Figure 5:
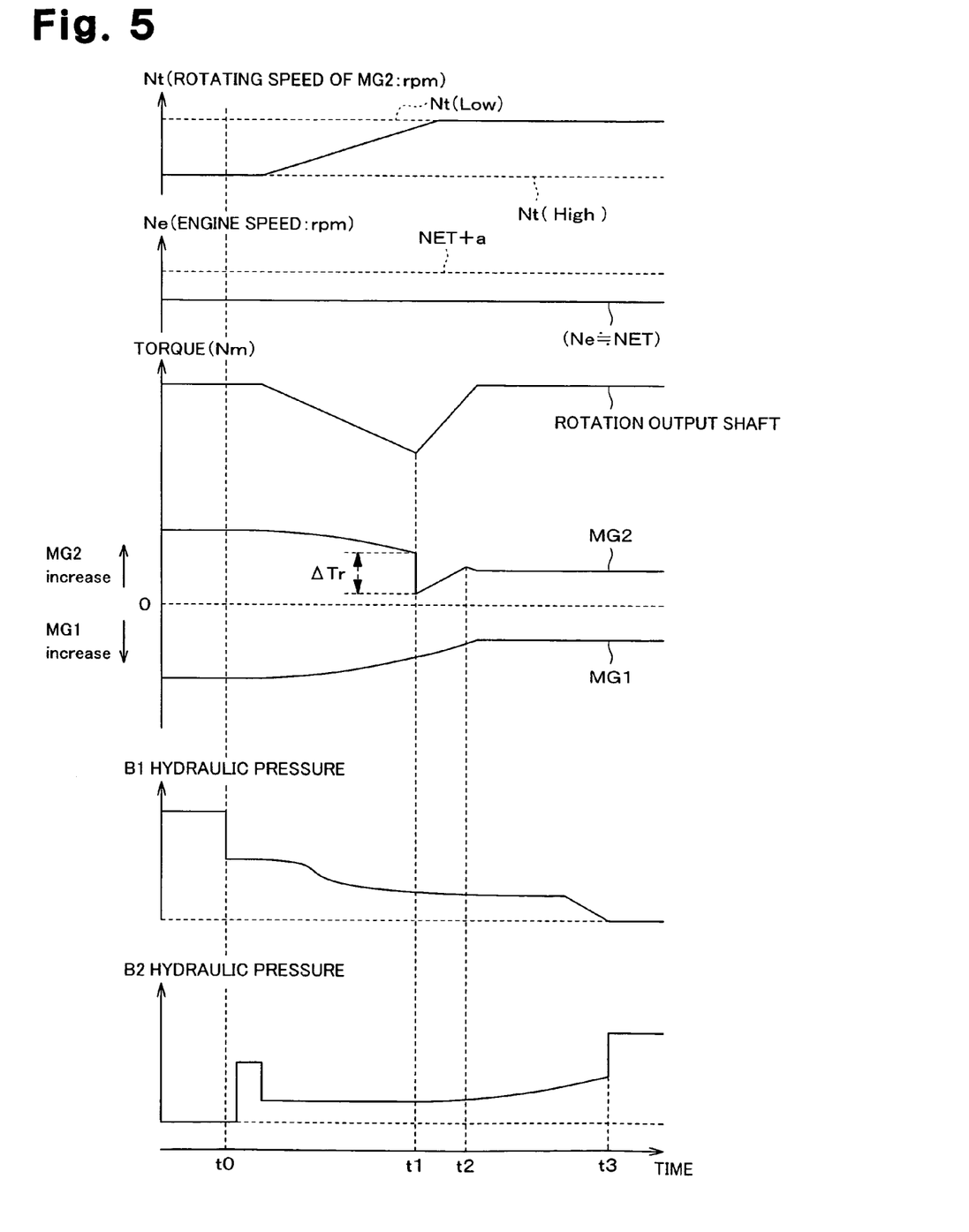
FIG. 5 is a timing chart showing an example of a control in the first embodiment.
Figure 6:
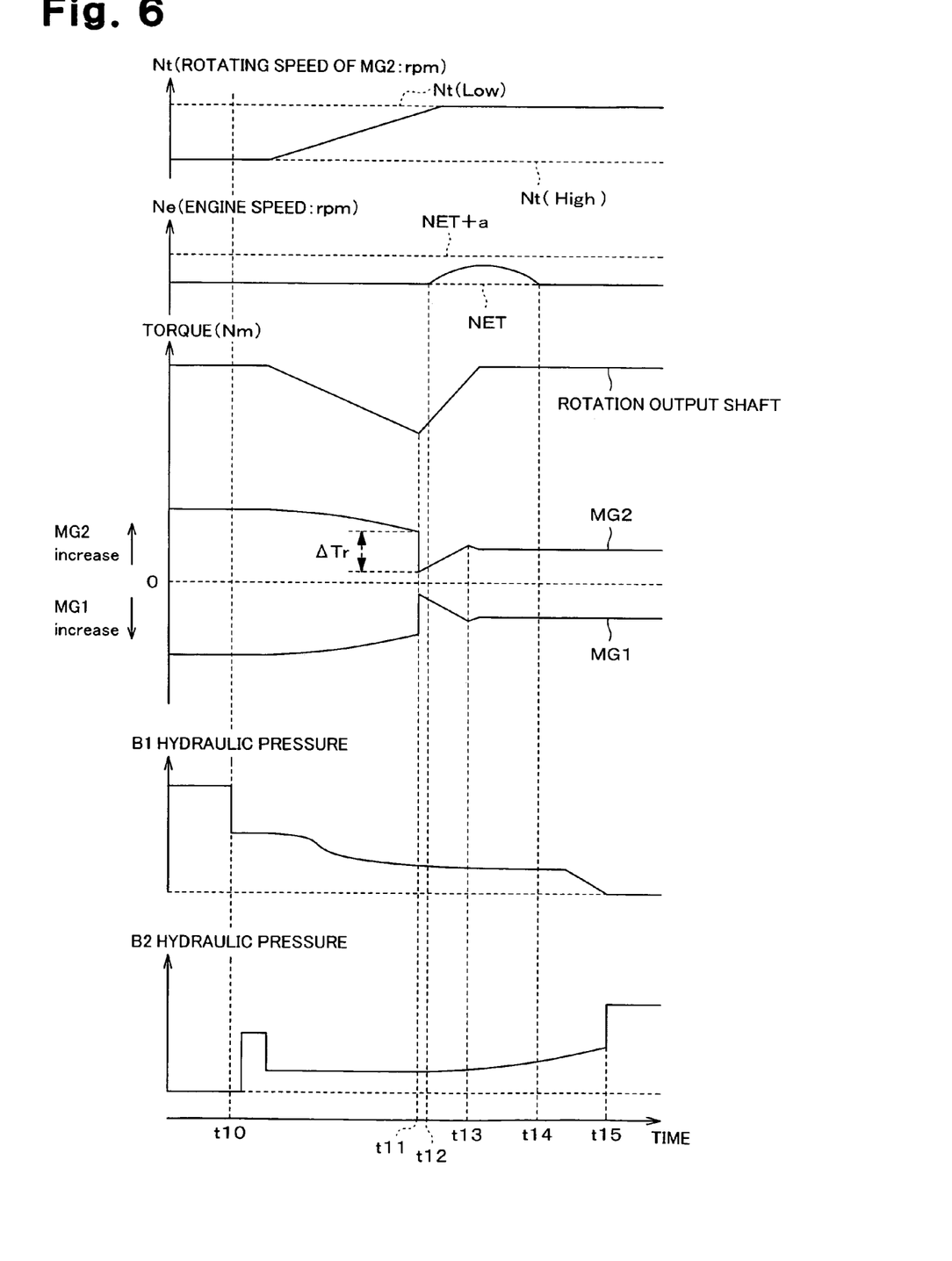
FIG. 6 is a timing chart showing an example of the control in the first embodiment.
Figure 7:
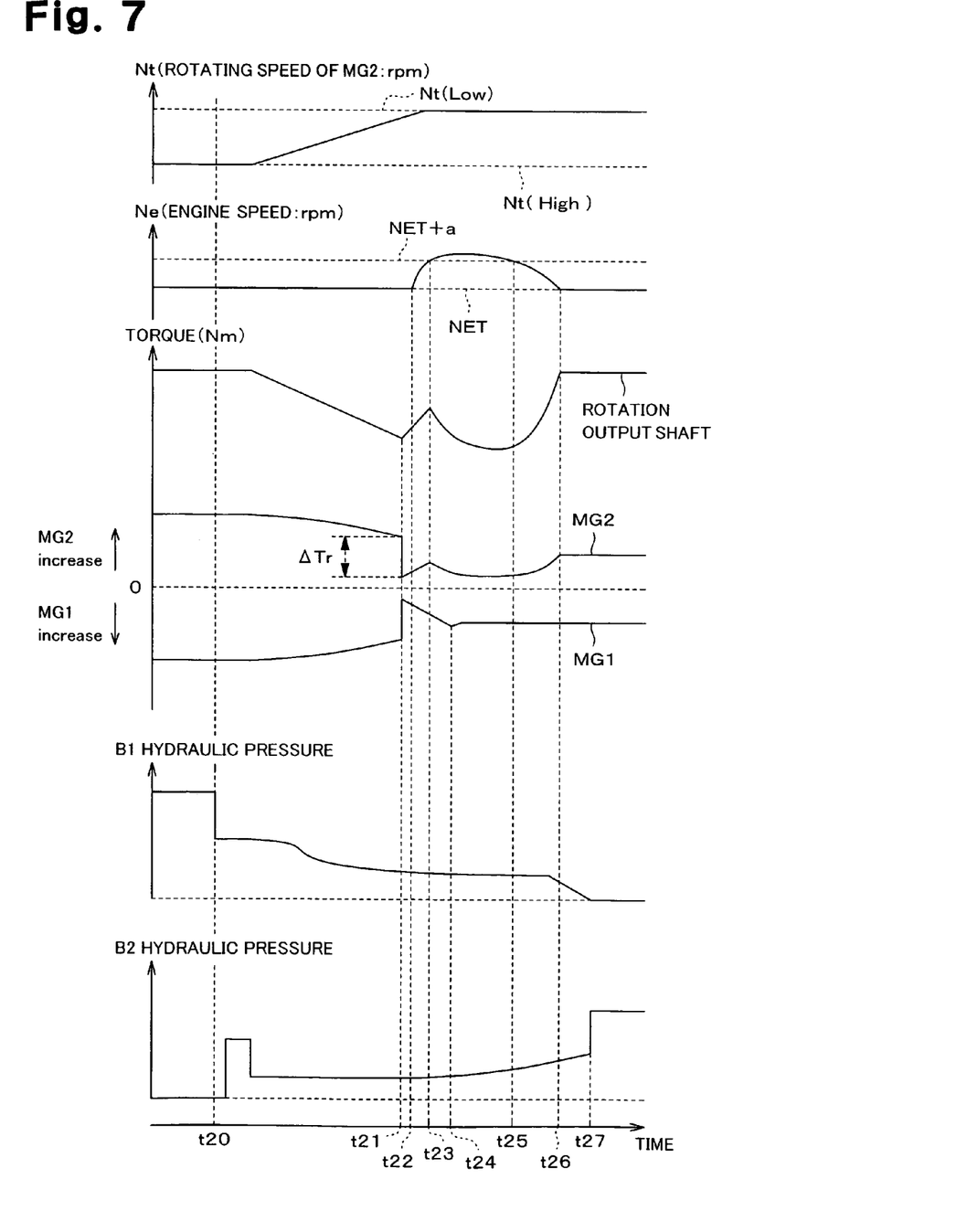
FIG. 7 is a timing chart showing an example of the control in the first embodiment.

As shown by a hydraulic pressure applied to the brakes B1 and B2 in FIG. 5, if the shift process is advanced and the T-ECU 30 outputs the torque reduction demand of the MG2 (yes in S102), the torque reduction of the MG2 for preventing the shock at the shifting time is executed (S104, t1 in FIG. 5). The torque reduction is executed by executing a reduction process (t1 in FIG. 5) of a fixed torque width ΔTr from a height of the torque in the normal control and a process (t1 to t2 in FIG. 5) of thereafter gradually canceling the torque reduction so as to return to the torque state in the normal control, as shown in FIG. 5.

Next, the execution of the MG1 torque reduction control process (FIG. 4) is started (S106).

In this case, even if the state in which yes is determined in step S102 is thereafter repeated at the same shifting time, the MG2 torque reduction (S104) and the MG1 torque reduction control process have been already started (S106), so they are not executed redundantly.

Next, a description will be given of the MG1 torque reduction control process (FIG. 4) the execution of which is started by step S106 mentioned above. The present process corresponds to a process which is repeatedly executed at a fixed time cycle by the MG-ECU 28.

When the present process is started, it is first determined whether or not the charge is limited (S150). In other words, in the case that the battery 26 is in a charged state equal to or more than a reference value for limiting the charge, in the charge control applied to the battery 26 executed by the MG-ECU 28 itself, the MG-ECU 28 limits the charge for protecting the battery 26. Further, in the case that a temperature of the battery 26 is equal to or less than a reference temperature and it is hard to charge the battery 26, the charge is also limited for protecting the battery 26. In the case of taking into consideration the temperature of the battery 26 as mentioned above, the MG-ECU 28 further detects the temperature of the battery 26 by a temperature sensor 26a or the like.

If the charge limit mentioned above is not executed (no in S150), it is determined whether or not the shift is finished (S158). If the shift is not finished (no in S158), the present process is temporarily finished as it is.

In the case that the charge limit is not executed as mentioned above, only the torque reduction of the MG2 is executed on the basis of the shifting time MG2 torque reduction control process (FIG. 3), and the power generation control is executed in the MG1 in accordance with the torque on the basis of the normal control, as shown in FIG. 5. In other words, the power generation amount of the MG1 is not lowered in correspondence to the torque reduction of the MG2. Accordingly, the power generation amount corresponding to the torque reduction of the MG2 is applied to the charging of the battery 26. Therefore, since a power generation load level by the MG1 is maintained, an engine speed Ne is not greatly changed after the torque reduction of the MG2. In this case, in the example in FIG. 5, the control is executed in such a manner as to establish an electric power balance state in which all the electric power generated by the MG1 is consumed in the MG2 without using the electric power from the battery 26, and charging to the battery 26, except the period between the timings t1 and t2. An electric power balance state in FIGS. 6 and 7 mentioned below is basically the same.

Further, if the shift is finally finished (yes in S158, t3 in FIG. 5), the MG1 torque reduction control process (FIG. 4) itself is stopped (S160). As mentioned above, the MG1 torque reduction control process (FIG. 4) stops until step S106 of the shifting time MG2 torque reduction control process (FIG. 3) is executed again.

If the charging is limited (yes in S150) in the MG1 torque reduction control process (FIG. 4), it is determined whether or not the engine speed Ne is smaller than a value (corresponding to a reference speed) obtained by adding an ascent width a to a target speed NET (S152). In this case, if a relation Ne<NET+a is established (yes in S152) as shown in a timing chart in FIG. 6 (t11), the MG1 torque reduction is executed for holding the electric power balance (S156, t11 to t13 in FIG. 6). In other words, the state of completely canceling the power generation amount by the MG1 on the basis of the electric power consumption by the MG2 is maintained until the timing t11 because of the charge limit, and this state is maintained also at the shifting time on the basis of the torque reduction of the MG1 in the same manner in correspondence to the torque reduction of the MG2.

Next, since the shift has not completed yet (no in S158), the present process is temporarily finished as it is.

Thereafter, the engine speed Ne is temporarily increased on the basis of the reduction of the power generation load by the MG1 (t12 to t14). However, as far as the relation Ne<NET+a is established (yes in S152), no is determined in step S158 through step S156, and the course of temporarily finishing the present process is repeated. In this case, since the MG1 torque reduction (S156) for holding the electric power balance has already been executed, it is not executed redundantly.

If the shift is finished (yes in S158, t15 in FIG. 6) while keeping the state of Ne<NET+a (yes in S152), the MG1 torque reduction control process (FIG. 4) itself is stopped (S160), and the process is completely finished.

In the case that a relation Ne≧NET+a is established (no in S152) before the shifting is finished, the internal combustion engine output reduction is executed in correspondence to the torque reduction of the MG2 (S154). In other words, if the relation Ne≧NET+a is established on the basis of the reduction (t21) of the power generation load by the MG1 (t23 to t25), as shown by a timing chart in FIG. 7, the output of the internal combustion engine 16 is lowered. Accordingly, the output torque of the rotation output shaft 6 is reduced (t23 and after). Accordingly, the power generation amount of the MG1 is lowered and the torque of the MG2 is temporarily lowered (t23 and after).

Further, if the relation is returned to the relation Ne<NET+a (yes in S152), the internal combustion engine output reduction is not executed. Accordingly, the temporarily generated output reduction of the internal combustion engine 16 is cancelled during the shifting so as to be restored (t26).

In the structure mentioned above, the internal combustion engine 16, the battery 26, the MG1, the MG2 and the engine speed sensor 16c correspond to a main power source, a power storage device, a generator, an electric motor, and a speed detecting section in claims, respectively. Steps S100, S102 and S104 of the shifting time MG2 torque reduction control process (FIG. 3) executed by the MG-ECU 28 corresponds to a process serving as an electric motor output reducing section. Step 150 of the MG1 torque reduction control process (FIG. 4) executed by the MG-ECU 28 corresponds to a process serving as charge determining section, step S156 corresponds to a process serving as power generation amount reducing section, and steps S152 and S154 correspond to a process serving as main power source output reducing section, respectively.

In accordance with the first embodiment described above, the following advantages are obtained.

(1) Since step S104 of the shifting time MG2 torque reduction control process (FIG. 3) is executed so as to reduce the output of the MG2 on the basis of the torque reduction demand from the T-ECU 30 at the shifting time of the transmission 14, the shock at the shifting time is prevented.

Further, when it is determined that it is impossible to charge the battery 26 in the MG1 torque reduction control process (FIG. 4) (yes in S150), the power generation amount is reduced on the basis of the torque reduction of the MG1 functioning as the generator (S156). Accordingly, since the electric power corresponding to the output reduction amount of the MG2 is not used as it is for charging the battery 26, an increase of the charge amount is suppressed or the charging amount is maintained. In the present embodiment, since the power generation amount is reduced in the MG1 in correspondence to the output reduction amount of the MG2, it is possible to reliably prevent the battery 26 from being charged. Accordingly, it is possible to prevent the battery 26 from being charged excessively.

(2) If the engine speed Ne is smaller than the reference speed (NET+a) for determining the excessive rotation (yes in S152), the output reduction of the internal combustion engine 16 is not executed. Accordingly, since it is not necessary to restore the internal combustion engine 16 from the output reduction, response delay is not generated in the vehicle traveling after the shifting.

The output reduction of the internal combustion engine 16 is executed first in the case that the relation Ne≧NET+a is established (no in S152). Accordingly, since it is possible to prevent the internal combustion engine 16 and the MG1 from being rotated excessively, and the output reduction of the internal combustion engine 16 is executed only in the case that a possibility of the excessive rotation exists, a frequency of the output reduction of the internal combustion engine 16 is limited. Further, if the possibility of the excessive rotation is lost (yes in S152) even in the case that the output reduction of the internal combustion engine 16 is executed, the output of the internal combustion engine 16 can be restored. Accordingly, it is possible to start the returning process in an early stage, and it is possible to suppress response delay at the traveling time.

Particularly, since the output reduction of the internal combustion engine 16 corresponds to the torque reduction of the MG2, it is possible to more suitably suppress the excessive rotation between the internal combustion engine 16 and the MG1.

(3) Since both of the cancellation of the torque reduction of the MG2, and the cancellation of the torque reduction of the MG1 are gradually executed, the rapid change of the control process is not generated. Thus, it is possible to execute a stable control process and it is possible to prevent the shock on the control.

(4) The internal combustion engine 16 functions as the main power source of the hybrid power unit 2. The reduction and restoration of the output of the engine 16 are executed by adjusting the throttle opening degree. The responsiveness of the engine 16 is not as high as that of the MG1 and MG2. However, since the present embodiment prevents response delay during traveling as described above, shift shock of the transmission 14 is reliably prevented.

It should be apparent to those skilled in the art that the present invention may be embodied in many other specific forms without departing from the spirit or scope of the invention. Particularly, it should be understood that the invention may be embodied in the following forms.

(a) In step S152 of the MG1 torque reduction control process (FIG. 4), the excessive rotation is determined on the basis of the engine speed Ne, however, it may be determined by directly detecting the rotation of the MG1 in the light of prevention of the excessive rotation of the MG1.

(b) In step S154 of the MG1 torque reduction control process (FIG. 4), the internal combustion output reduction is executed in correspondence to the torque reduction of the MG2. However, the internal combustion engine output reduction may be executed in correspondence to the torque reduction of the MG1, that is, the reduction of the power generation amount.

Further, the internal combustion engine output reduction may be executed in correspondence to the reduction amount of both of the torque reduction of the MG2 and the torque reduction of the MG1.

The invention claimed is:

1. A hybrid power unit, comprising:
   a main power source;
   a rotation output shaft, to which driving force output by the main power source is transmitted;
   a generator, to which the driving force of the main power source is transmitted, the power being distributed to the rotation output shaft and the generator;

a battery, to which electricity generated by the generator is charged;

a motor driven by at least one of electricity from the generator and electricity from the battery;

a transmission transmitting the driving force of the motor to the rotation output shaft;

a first reduction section that reduces the output of the motor when the transmission is shifted;

a charge determining section determining whether charging of the battery is permitted; and a second reduction section, wherein if the charge determining section determines that charging of the battery is not permitted in a period where the first reduction section reduces the output of the motor, the second reduction section reduces a power generation amount of the generator.

2. The hybrid power unit according to claim 1,
wherein the second reduction section reduces the power generation amount of the generator by an amount that corresponds to an output reduction amount by which the first reduction section has reduced the output of the motor.

3. The hybrid power unit according to claim 1,
wherein, after reducing the output of the motor, the first reduction section gradually cancels the output reduction of the motor, and wherein, in accordance with the cancellation of the output reduction of the motor, the second reduction section gradually cancels the reduction of the power generation amount of the generator.

4. The hybrid power unit according to claim 1, further comprising:

a speed detection section that detects a rotation speed of the main power source or the generator; and a third reduction section, wherein if the rotation speed detected by the speed detection section exceeds a reference rotation speed in a period where the first reduction section reduces the output of the motor, the third reduction section reduces the output of the main power source.

5. The hybrid power unit according to claim 4,
wherein the third reduction section reduces the output of the main power source by an amount that corresponds to at least one of the output of the motor reduced by the first reduction section and the power generation amount of the generator reduced by the second reduction section.

6. The hybrid power unit according to claim 1, wherein the main power source is an internal combustion engine.

7. The hybrid power unit according to claim 1,
wherein, if a charge amount of the battery is equal to or greater than a reference amount, or if a temperature of the battery is equal to or lower than a reference temperature, the charge determining section determines that charging of the battery is not permitted.

* * * * *